Figure 2:
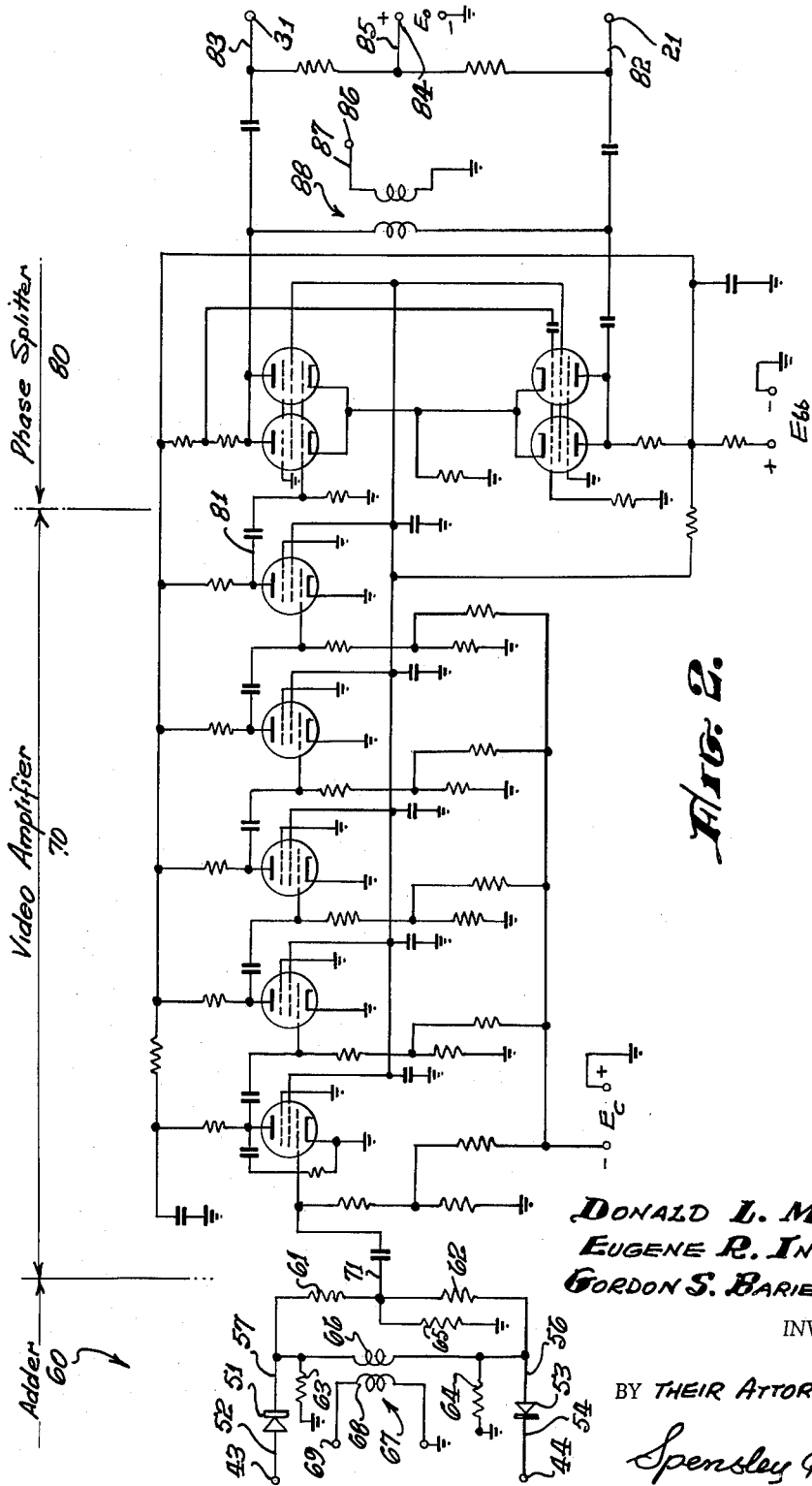

Nov. 30, 1965   D. L. MARGERUM ETAL   3,221,251
PHASE MEASURING AT MICROWAVE FREQUENCIES WITH A CLOSED
LOOP SERVO SYSTEM USING TRAVELLING WAVE TUBES
Filed June 15, 1961   3 Sheets-Sheet 1
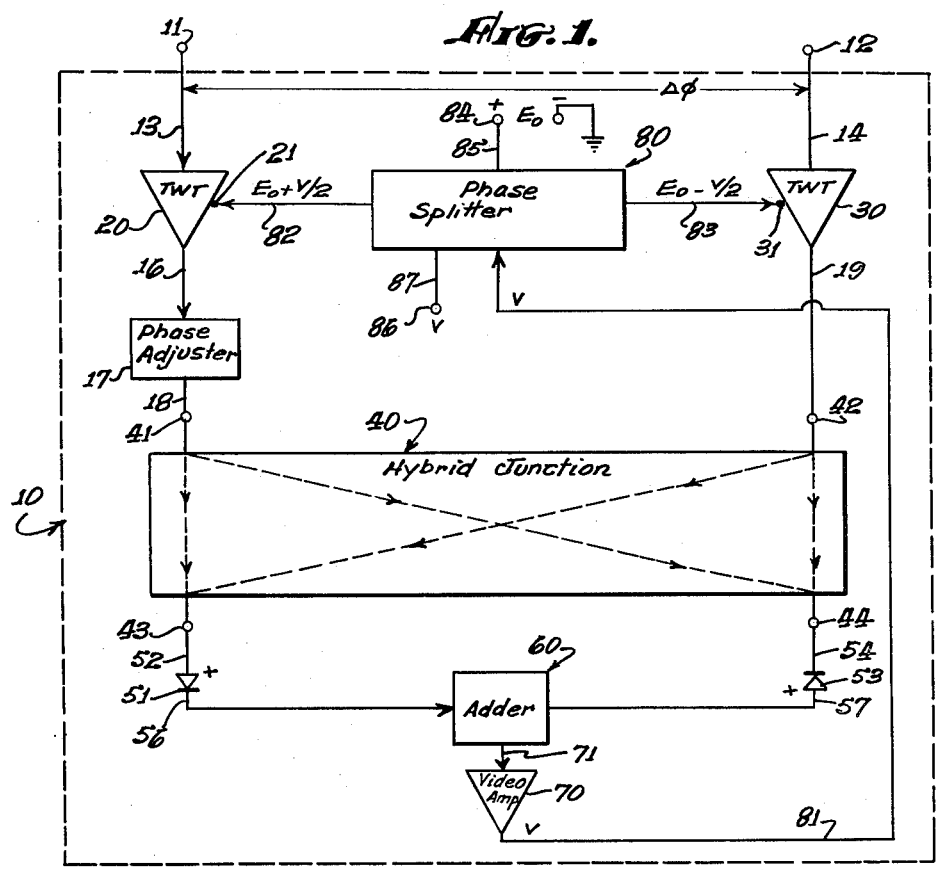
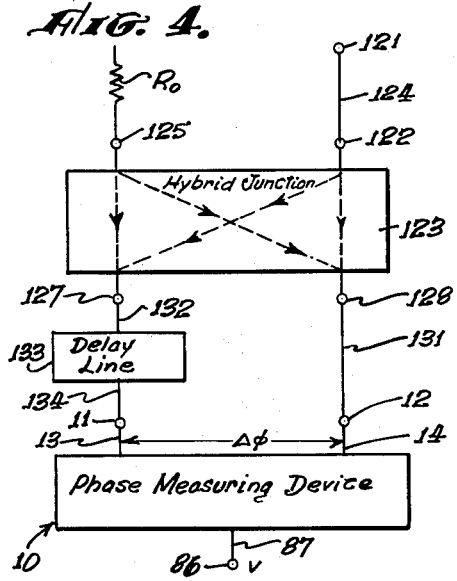
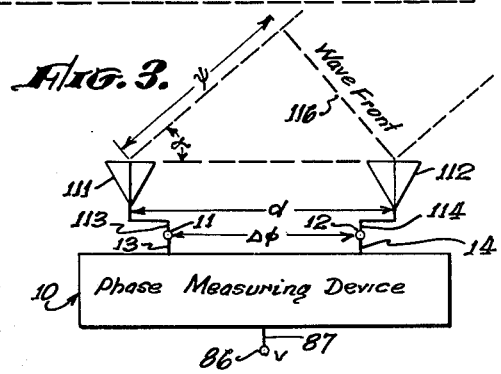
DONALD L. MARGERUM,
EUGENE R. INGERSOLL,
GORDON S. BARIENBROCK,
INVENTORS.
BY THEIR ATTORNEYS.
Spensley & Horn.

DONALD L. MARGERUM,
EUGENE R. INGERSOLL,
GORDON S. BARIENBROCK,
INVENTORS.

BY THEIR ATTORNEYS

Spensley & Horn.

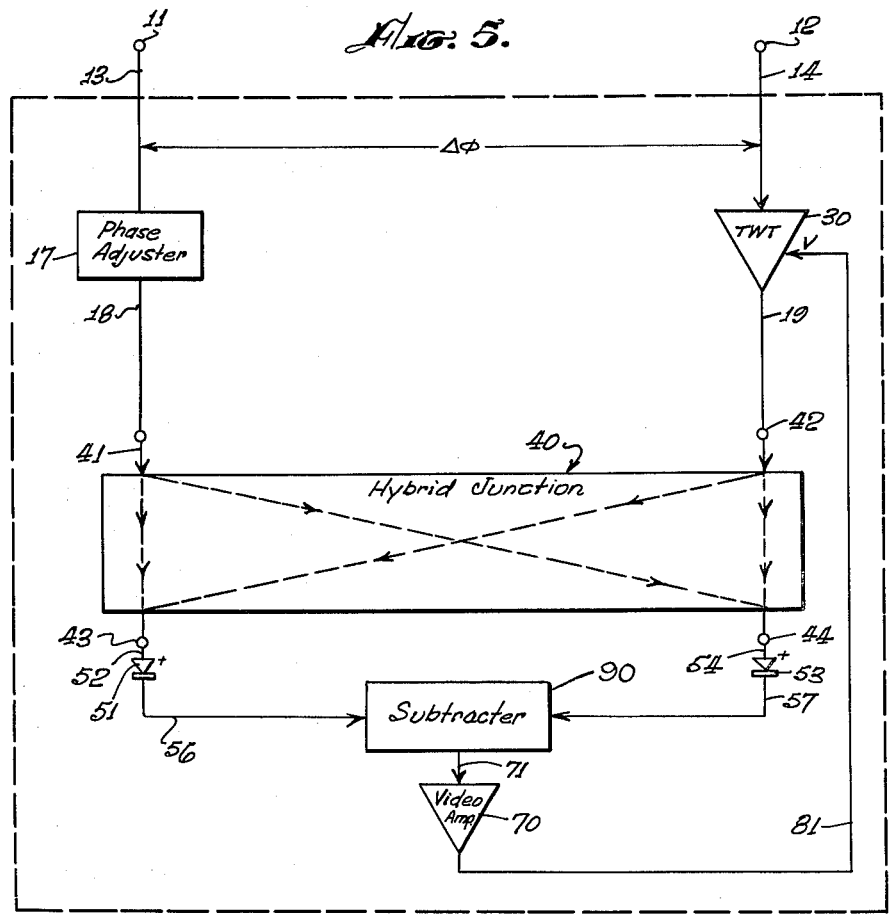

United States Patent Office 3,221,251
Patented Nov. 30, 1965

3,221,251
PHASE MEASURING AT MICROWAVE FREQUENCIES WITH A CLOSED LOOP SERVO SYSTEM USING TRAVELLING WAVE TUBES
Donald L. Margerum and Eugene R. Ingersoll, Woodland Hills, and Gordon S. Barienbrock, Santa Monica, Calif., assignors to Electronic Specialty Company, a corporation of California
Filed June 15, 1961, Ser. No. 117,373
14 Claims. (Cl. 324—84)

This invention relates to systems for measuring phase differences between electrical signals and more particularly to such systems incorporating a closed loop servo system working to a null balance.

The rapid detection and measurement of phase differences between electrical signals has widespread application in the electronics art, such as in direction finding and frequency measuring devices, for example. In certain applications, it is desirable to rapidly measure phase differences between a succession of unrelated short signal pulses, such as radar pulses, occurring over a wide range of frequencies, with the measurements being substantially independent of signal strength. However, at the present state of the art, relatively complex apparatus is required to accurately detect and measure phase differences between microwave signal bursts which are only micro-seconds in duration. Furthermore, present art phase measuring apparatus are capable of operation over only very limited ranges of phase angle differences (typically less than ±60 degrees), and depend upon amplitude equality between the two signals to be compared.

It is therefore an object of the present invention to provide improved phase measuring apparatus.

It is also an object of the present invention to provide phase measuring apparatus having an extremely rapid response time.

It is another object of the present invention to provide phase measuring apparatus wherein the measurements are relatively independent of differences in signal strength between the two signals being compared.

It is a further object of the present invention to provide improved phase measuring apparatus of the closed loop nulling type.

It is a still further object of the present invention to provide improved phase measuring apparatus for use at microwave frequencies.

It is also an object of the present invention to provide phase measuring apparatus wherein phase measurements are relatively independent of signal strength over a wide frequency range.

It is yet another object of the present invention to provide improved direction finding apparatus.

It is another object of the present invention to provide direction finding apparatus wherein a direct measurement of time delay enables determination of the angle of arrival of electromagnetic wave signals independently of their frequency.

It is still another object of the present invention to provide improved frequency measuring apparatus.

The objects of the present invention are accomplished by a novel electronic closed loop servo system wherein electrical measurement of phase difference between signals applied to two input terminals produces a control voltage having a polarity determined in accordance with whether the signal applied to one input terminal is in leading or in lagging phase relationship with the signal applied to the other input terminal. This control voltage rapidly changes in response to relative phase changes to adjust the system to a null balance. Read-out of the phase difference is accomplished by monitoring the control voltage, the steady state value which the control voltage achieves upon nulling then providing a direct indication of phase difference. The hereinbelow illustrated embodiment of the present invention servo system includes two phase shifting devices for introduction of a controllable variable phase shift, each phase shifting device being fed from a different one of the two signal input terminals. The output of each phase shifting device is fed to a separate input of a hybrid junction which detects differences in phase by vectorially combining the applied voltages in phase quadrature to produce output voltage pulses the magnitudes of which vary in accordance with changes in phase between the signals applied to the different inputs. Each of the hybrid outputs is fed to an envelope detector and the difference between the resulting video signals is taken in a subtracter circuit. The amplified output of the subtracter circuit is utilized as a control voltage which is fed back to the phase shifting devices, thereby completing the servo loop. Monitoring of the steady state magnitude the control voltage achieves upon nulling provides the desired read-out of phase difference. The control voltage is differentially applied to the phase shifting devices in such a manner as to vary the phase shifts of the devices by amounts necessary to readjust the system to a null balance.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:
FIGURE 1 is a schematic diagram in partial block form of a closed loop servo system in accordance with the present invention;
FIGURE 2 is a schematic diagram showing video circuitry suitable for use in the closed loop servo system of the present invention;
FIGURE 3 is a schematic diagram, partially in block form, of a direction finder utilizing the closed loop servo system of the present invention;
FIGURE 4 is a schematic diagram, partially in block form, of frequency measuring apparatus incorporating the closed loop servo system of the present invention; and
FIGURE 5 is a schematic diagram in partial block form of an alternative embodiment of a closed loop servo system in accordance with the present invention.

Turning now to FIGURE 1 of the drawing, there is shown a block diagram of a basic closed loop servo system phase measuring device in accordance with the present invention, the device being generally indicated by the reference numeral 10 and enclosed within a dotted line rectangle. The servo system 10 is provided with two signal input terminals, designated by the reference numerals 11 and 12, for application to the system of the electrical signals between which phase differences are to be measured. Signals applied to the input terminal 11 are fed to a first phase shifting device 20 by an electrical lead 13. Signals applied to the input terminal 12 are fed to a second phase shifting device 30 by an electrical lead 14. In the presently preferred embodiment, the phase shifting devices are traveling-wave tube amplifiers herein abbreviated by the symbol TWT. Traveling-wave tubes are well known in the art and are commercially available for operation at frequencies from about 250 mc. to about 18,000 mc. Traveling-wave tubes are presently preferred because of certain desirable characteristics: (1) practically instantaneous control of internal phase shift in response to changes in helix voltage; (2) linear phase shift characteristics; (3) octave bandwidth; and, (4) variable time delay type of phase shift control. The combination of these enumerated characteristics provides a greater field of potential application for the phase measuring apparatus of the present invention. However, it is understood that for certain applications of the present invention apparatus other types of phase shifting devices, such as ferrite phase shift devices, for example, will be suitable. Upon explanation of the principles of operation of the present invention device, the types of phase shifting apparatus suitable for a contemplated application will become apparent to those skilled in the art.

The output of the TWT 20 is fed to an input terminal 41 of a hybrid junction 40 through an electrical lead 16, a phase adjusting means 17 and an electrical lead 18. The phase adjusting means 17 allows balancing of the outputs from the TWT's 20 and 30 for in-phase input conditions. Although the illustrated embodiment utilizes a line stretcher as the phase adjusting means 17, other known present art devices are also suitable. The output of the TWT 30 is fed to an input terminal 42 of the hybrid junction 40 through an electrical lead 19.

The hybrid junction 40 has two output terminals 43 and 44. The characteristics of the hybrid junction 40 are such that upon application of a signal to the input terminal 42 the phase of the output signal appearing at the terminal 44 will be lagging 90° with respect to that of the output signal appearing at the terminal 43; similarly, upon application of a signal to the input terminal 41 the phase of the output signal appearing at the terminal 43 will be lagging 90° with respect to that appearing at the terminal 44, thereby providing the desired combination of signals applied to the input terminals 41 and 42. Hybrid junctions are well known in the art and hence will not be discussed in detail beyond stating that in the hybrid junction 40 there is no direct intercoupling of the input terminals 41 and 42, thereby allowing the isolation of the input terminals from each other while coupling signals from both input terminals to each of the output terminals. Hence, input signals are independently vectorially combined in phase quadrature at the outputs of the hybrid junction 40 with no significant interaction between signals applied to its two input terminals 41 and 42.

One hybrid output is fed from the output terminal 43 to the anode terminal of a diode video detector 51 through an electrical lead 52. The other hybrid output is fed from the output terminal 44 to the cathode terminal of a diode video detector 53 through an electrical lead 54. For efficient operation at microwave frequencies the electrical leads 13, 14, 16, 18, 19, 52 and 54 are preferably sections of waveguide or coaxial cable. The diode 51 provides a positive video pulse output at its cathode terminal in accordance with the envelope of an R.F. signal pulse applied to its anode while the diode 53 detects the envelope of an applied R.F. signal pulse and provides a negative video pulse at its anode terminal. Crystal diodes are presently preferred for use at microwave frequencies as the video detectors 51 and 53.

The cathode terminal of the diode 51 is connected to one input of an adder circuit 60 through an electrical lead 56. The anode terminal of the diode 53 is connected to another input of the adder 60 through an electrical lead 57. Positive video pulses from the diode 51 are added in the adder circuit 60 to simultaneously impressed negative video pulses from the diode 53. Thus it is seen that the dissimilar orientation of the diodes 51 and 53 together with the adder circuit 60 forms the equivalent of a subtracter circuit, thereby resulting in simpler circuitry than a conventional subtracter circuit to each input of which is fed pulses of identical polarity. The magnitude of the video pulse fed to the adder 60 from the diode 51 will be identical with the magnitude of the video pulse fed to the adder 60 from the diode 53 under in-phase input conditions; hence there is no signal output from the adder 60 under in-phase input conditions. However, whenever there is a phase difference between the signals applied to the input terminals 11 and 12 the magnitudes of the video pulses from the diodes 51 and 53 will differ, which diode provides the greater pulse magnitude being determined in accordance with whether the signal applied to one input terminal is in leading or in lagging phase relationship with the signal applied to the other input terminal. Therefore the signal output from the adder circuit 60 is polarized in accordance with leading and lagging input signal phase relationships.

The output from the adder 60 is fed to a video amplifier 70 through an electrical lead 71. The video amplifier 70 has a bandwidth on the order of about 50 megacycles and sufficient gain to provide a desired range of controlled voltage amplitude. The output of the video amplifier forms the desired control voltage, herein designated V. The voltage V is in the form of video pulses derived from R.F. signal pulses applied to the input terminals 11 and 12, the polarity of each output pulse being determined in accordance with whether the signal applied to one input terminal is in leading or in lagging phase relationship with the signal applied to the other input terminal and the output pulse height being determined by the phase difference, $\Delta\phi$, between the signals applied to the input terminals.

The servo loop is closed by feeding the control voltage V from the output of the video amplifier 70 through an electrical lead 81 and a phase splitter 80 back to the phase shifting devices 20 and 30, the phase splitter 80 being connected to control the phase shifts of the TWT's 20 and 30 in opposing senses by applying a positive signal to the helix of one TWT and a negative signal to the helix of the other TWT. In the illustrated embodiment the phase splitter 80 is in the form of a paraphase amplifier, a paraphase amplifier being presently preferred since it is a self-balancing type of phase inverter. One output of the phase splitter 80 is connected to the helix terminal 21 of the TWT 20 by an electrical lead 82, the other output of the phase splitter 80 being connected to the helix terminal 31 of the TWT 30 by an electrical lead 83. The two outputs of the phase splitter 80 are coupled to a helix supply voltage terminal 84 by an electrical lead 85. The positive terminal of a source of D.C. potential, $E_0$, is connected to the terminal 84 to supply the necessary helix voltage for the TWT's 20 and 30. The negative terminal of the D.C. source $E_0$ is grounded. For ease of explanation, the paraphase amplifier forming the phase splitter 80 is specified to have unity gain. In accordance with its phase inverter action the paraphase amplifier divides each pulse V in half and superimposes a pulse of magnitude $V/2$ on the D.C. helix voltage, the voltage on the helix of the TWT 20 being $E_0+V/2$ while that on the helix of the TWT 30 is $E_0-V/2$, for the duration of a positive signal pulse V.

The relationship between a control voltage pulse V and the phase difference $\Delta\phi$ between the signals causing the pulse V, is derived as follows:

Let $\Delta\phi_{20}$ = phase shift in TWT 20

$\Delta\phi_{30}$ = phase shift in TWT 30

$\Delta\phi$ = signal phase difference between terminals 11 and 12

$V$ = control voltage magnitude $f$ = signal frequency $f_0$ = frequency at which TWT's 20 and 30 are balanced for in-phase input conditions by phase adjusting means 17

$K_{20}$ = slope of the phase shift vs. helix voltage characteristic of TWT 20 at frequency $f_0$ and $K_{30}$ = slope of the phase shift vs. helix voltage characteristic of TWT 30 at frequency $f_0$ The phase shift in TWT 20 is given by $$\Delta\phi_{20} = \frac{V}{2} K_{20} \frac{f}{f_0}$$

Likewise $$\Delta\phi_{30} = -\frac{V}{2} K_{30} \frac{f}{f_0}$$

Therefore $$\Delta\phi = \Delta\phi_{20} - \Delta\phi_{30}$$

or $$\Delta\phi = \frac{V}{2} \frac{f}{f_0} [K_{20} + K_{30}] \quad (1)$$

The control voltage V is seen from Equation 1 to be directly proportional to the signal phase difference for signals of known frequency. So connection of a voltage measuring device to monitor the control voltage V will provide the desired read-out of phase information. An output terminal 86 is provided for connection of a suitable voltage measuring device, the terminal 86 being coupled to a suitable point in the output circuit of the phase splitter 80 by an electrical lead 87 in a manner to be hereinafter explained. The voltage measuring device is connected to measure the voltage between the terminal 86 and ground. A cathode ray oscilloscope will provide a constant visual monitoring of the control voltage pulses appearing at the terminal 84. Alternatively, the terminal 84 may be coupled to the magnetic head of a tape recorder and a recording made of the control voltage pulses for subsequent playback.

Because of the extremely rapid response and linear phase shift characteristics of the TWT's used as phase shifting devices the servo loop is quickly driven to a null balance upon signal phase differences between the input terminals 11 and 12. The servo system response time of the illustrated embodiment is about 0.03 microsecond, thereby providing a null balance to be achieved during signal pulses of durations as short as 0.1 microsecond. Because of the extremely rapid response time of the servo loop there might be a slight degree of overshoot of the steep leading edges of the control voltage pulses; however, it is understood that the voltage V refers to the practically instantaneously achieved steady state magnitude of the control voltage pulses.

Turning now briefly to FIGURE 2 of the drawing, there is shown the schematic diagram of typical video circuitry for the servo loop of FIGURE 1. The adder circuit 60 consists of resistors 61, 62, 63, 64 and 65, together with the primary winding 66 of a video pulse transformer 67. The resistor 61 is connected between the cathode terminal of the diode 51 and the electrical lead 71. The resistor 62 is connected between the anode terminal of the diode 53 and the electrical lead 71. The resistor 65 is connected between the electrical lead 71 and ground. The resistor 63 is connected between the cathode of the diode 51 and ground and the resistor 64 is connected between the anode of the diode 53 and ground. The primary winding 66 of the pulse transformer 67 is connected between the cathode terminal of the diode 51 and the anode terminal of the diode 53. The resistors 61–65 form a summing network, the resistances of the resistors 61 and 62 being equal and approximately one-tenth to one-hundredth of the resistance of resistor 65 and ten to one hundred times the resistance of resistors 63 and 64. The resistors 63 and 64 are of equal resistance and provide the correct load resistance for the crystal detectors 51 and 53. One end of the secondary winding 68 of the transformer 67 is grounded and the other end connected to a terminal 69. The terminal 69 is provided to enable connection thereto of a voltage-sensitive device to monitor the video pulse in the adder circuit 60. Such monitoring will enable the operator of the phase measuring apparatus to establish a threshold and instantly ascertain whether the signal-to-noise ratio is adequate and to discriminate between measurement of in-phase input signals and merely inadequate signal strength.

The video amplifier consists of five cascaded vacuum tube video amplifier stages utilizing resistance coupling throughout. The phase splitter 80 is a paraphase amplifier circuit utilizing parallel connected pentode tubes to provide the necessary power output. A pulse transformer 88 is provided to enable measurement of video pulse magnitude, V, at the output of the paraphase amplifier, the primary winding being connected between the plates of the paraphase amplifier tubes as shown. One end of the secondary winding of the pulse transformer 88 is grounded while the other end is connected to the output terminal 86 by the electrical lead 87. The pulse transformer 88 has a 1:1 turns ratio to thereby regain the pulse magnitude V across the secondary winding since pulses of $V/2$ magnitude and opposite polarity are applied to each end of its primary winding. The foregoing circuitry for the adder 60, the video amplifier 70 and the phase splitter 80 is straight-forward in design and is presented merely for purposes of illustration.

In the two TWT embodiment of FIGURE 1, the TWT's shift in phase toward each other, i.e., so as to minimize the phase difference between them. This type of operation is accomplished by the phase splitter 80. Of course, when using only a single TWT, such as is shown in the embodiment of FIGURE 5 wherein only TWT 30 is used, no phase splitter is needed; however, the phase shift of the TWT in the single-TWT embodiment must be about twice as great as the phase shift of each TWT in the two-TWT embodiment in order to reach the null balance. It is therefore apparent that the shortest response time is obtained with the two-TWT embodiment of FIGURE 1, and hence this embodiment is presently preferred. In the FIGURE 5 embodiment, since the TWT 20 and the phase splitter 80 are not utilized, the electrical lead 13 directly connects the input terminal 11 to the phase adjuster 17 and the electrical lead 81 couples the control voltage output of the video amplifier 70 directly to the helix terminal 31 of the TWT 30. This control voltage may be superimposed upon a steady state D.C. helix voltage, depending upon the characteristics of the particular TWT utilized, as indicated in the FIGURE 1 embodiment. The FIGURE 5 embodiment also illustrates the use of a subtracter 90, in combination with similar orientation of the diodes 51 and 53, which is the operational equivalent of the adder 60 and dissimilar diode orientation shown in FIGURE 1.

As an example of the versatility of the closed loop servo system phase measuring device 10 of FIGURE 1, in FIGURE 3 of the drawing there is shown its application in a microwave direction finder. The phase measuring device of FIGURE 1 is directly adaptable for direction finding use by merely connecting the device to an antenna array. In the embodiment of FIGURE 3 a two-antenna array is shown, the antennas being designated by the reference numerals 111 and 112. The antenna 111 is connected to the input terminal 11 of the phase measuring device 10 by an electrical lead-in 113. The antenna 112 is connected to the input terminal 12 of the phase measuring device 10 by an electrical lead-in 114.

As an illustrative example of the use of the device in a direction finder assume that the antennas 111 and 112 are separated by a distance $d$ and that an incoming signal wave front of frequency $f$, indicated by the dotted line 116, arrives at an angle $\alpha$ with respect to the antenna array as shown. The wave front 116 impinges on the antenna 112 before it arrives at antenna 111 by a time interval related to the distance $x$. Hence, a signal is applied to the terminal 12 of the phase measuring device 10 slightly before application of the signal to the input terminal 11 thereof. The phase difference is related to $x$ and $\alpha$ by $$\Delta\phi = \frac{2\pi x}{\lambda} = \left(\frac{2\pi f}{c}\right)x = \frac{2\pi f}{c}d\cos\alpha$$

Therefore, $$\alpha = \cos^{-1}\left[\frac{c(\Delta\phi_{20} - \Delta\phi_{30})}{2\pi fd}\right] \quad (2)$$

where $c$ = velocity of light.

The input signals are amplified by the TWT's 30 and 20 and fed to the hybrid junction 40 where they are vectorially combined in phase quadrature. The voltage appearing at the output terminal 44 of the hybrid junction 40 will differ from that appearing at the output terminal 43 because of the phase difference between the signals resulting from the delay in application of the signal to the input terminal 41 relative to that applied to the input terminal 42. Hence, the magnitudes of the voltage pulses appearing at the outputs of the diode detectors 53 and 51 will also accordingly differ. The difference between these pulses forms the resulting control voltage pulse which is fed to the output terminal 79 and to the phase splitter 80 for application to the helices of the TWT's 30 and 20 to control their phase shift characteristics in the manner described hereinabove. Note that in this direction finder application each measurement is made between signals derived from one electromagnetic wave arriving at the input terminals at slightly different times; hence there is no frequency differential between the signals being compared at any one time. Although the device is initially adjusted for null balance under in-phase input conditions at a frequency $f_0$ by the phase adjuster 17, the direction of the electromagnetic waves of other frequencies can also be determined without further manual adjustment of the system since the phase shift corresponding to a given angle of arrival is directly proportional to frequency as is the compensating phase shifts of the TWT's for a given control voltage. Thus no change in control voltage is required upon changes in frequency, for a given angle of arrival. The frequency independence of the direction finder is best shown by noting that $$\Delta\phi = \frac{2\pi f}{c}x$$

Substituting for $\Delta\phi$ in Equation 1 gives:

$$\frac{2\pi f}{c}x = \frac{V}{2}\frac{f}{f_0}[K_{20} + K_{30}]$$

Therefore $$x = \frac{Vc}{4\pi f_0}[K_{20} + K_{20}]$$

Thus, the determination of $x$ is independent of frequency, and the angle of arrival $\alpha$ is then given by:

$$\alpha = \cos^{-1}\frac{x}{d}$$

and so $$\alpha = \cos^{-1}\left[\frac{Vc}{4\pi f_0 d}(K_{20} + K_{30})\right] \quad (3)$$

So it is seen that the variable time delay type of phase control, characteristic of TWT's, enables measurement of signal arrival angles independent of frequency.

Turning now to FIGURE 4 of the drawing there is shown an application of the phase measuring device 10 in a microwave frequency meter. In this application an input signal is split in a power divider into two signals. One signal is fed directly to the phase measuring device 10 while the other signal is passed through a delay line before being applied to the phase measuring device. A signal input terminal 121 is provided for connection to a source of signal pulses the frequencies of which are to be measured. The input terminal 121 is electrically connected to the second input terminal 122 of a power divider in the form of a hybrid junction 123 through an electrical lead 124. The first input terminal 125 of the hybrid junction 123 is terminated in its characteristic impedance $R_0$ to prevent undesired reflections between the hybrid junction output terminals 127 and 128. The output terminal 128 of the hybrid junction 123 is connected to the input terminal 12 of the phase measuring device 10 by an electrical lead 131. The output terminal 127 of the hybrid junction 123 is coupled to the input terminal 11 of the phase measuring device 10 through an electrical lead 132, a delay line 133 and an electrical lead 134. The characteristics of the delay line 133 are chosen such that a phase delay (including the differential delay introduced by the hybrid junction 123) of an integral number of half wave lengths is introduced at the center frequency, $f_0$, of the frequency range throughout which it is desired to measure frequency. It has been found that a phase shift of 450° through the delay line 133 at the center frequency (in conjunction with the 90° phase delay of the hybrid junction 123 used as the power divider) will provide the maximum utilization of the sensitivity of the phase measuring device 10 and yet avoid ambiguous readings over a 2:1 frequency range ($f_{max.} = 2f_{min.}$).

The phase adjuster 17 is adjusted at the center frequency $f_0$ for in-phase input conditions to provide equal phase shifts through the TWT's 20 and 30, as evidenced by zero control voltage output at terminal 86. When a signal pulse of the center frequency $f_0$ is applied to the input terminal 121 it is split into two signals by the power divider hybrid junction 123, one signal appearing at the output terminal 128 and the other at the output terminal 127. The signal appearing at the output terminal 128 is applied directly to the input terminal 12 of the phase measuring device 10, and to the TWT 30 therein. The signal appearing at the output terminal 127 of the hybrid junction 123 leads the signal simultaneously appearing at the terminal 128 by 90°, but is delayed within the delay line 133 for 450 electrical degrees before its application to the input terminal 11 of the phase measuring device 10, and to the TWT 20 therein. Hence, application of a signal pulse of frequency $f_0$ to the input terminal 121 will result in a phase differential of 360 electrical degrees between the signal applied to the TWT 20 and the signal applied to the TWT 30.

As signals pass through the phase measuring device 10 they are detected and amplified in the hereinabove described manner to produce a control voltage pulse of a predetermined magnitude. The magnitude of the control pulse appearing at the output terminal 86 is related to frequency as shown in the following derivation:

The difference in phase shifts through the two channels is in accordance with the relationship $$\left[\Delta\phi_{20} + \left(n\pi + \frac{\pi}{2}\right)\frac{f}{f_0}\right] - \left[\Delta\phi_{30} + \frac{\pi}{2}\right] = n\pi \quad (4)$$

where $n$ is a positive integer, and where the first bracketed term includes the phase shift through the delay line 133 and the second bracketed term includes the phase shift through the power divider hybrid junction 123.

In terms of the phase difference in the phase shifters the general solution of Equation 4 becomes $$f = f_0\left[\frac{(\Delta\phi_{30} - \Delta\phi_{20})}{n\pi + \pi/2} + 1\right] \quad (5)$$

In the special case wherein the phase shifters are of the variable time delay type, such as TWT's, a substitution can be made for the term $(\Delta\phi_{30} - \Delta\phi_{20})$ in Equation 5 by an expression in terms of the control voltage V derived from Equation 1. Upon performing such a substitution Equation 5 then becomes $$f = \frac{f_0}{1 - \frac{V}{2n\pi + \pi}(K_{20} + K_{30})} \quad (6)$$

Because of the characteristic operating range of the phase measuring device 10, the difference in phase shift through the two channels of the frequency meter of FIGURE 4 cannot vary by more than ±180° over the operating frequency range, thereby limiting the length of the delay line 133 which comprises the frequency dependent part of the phase difference. The maximum value of the delay line phase shift, $\Delta\phi_0$, is determined from the following relations.

$$\frac{f_{max.}}{f_0}\phi_0 - \phi_0 \leq \pi \text{ or } f_0 \geq \frac{f_{max.} \phi_0}{\pi + \phi_0}$$

$$\phi_0 - \frac{f_{min.}}{f_0}\phi_0 \leq \text{ or } f_0 \leq \frac{f_{min.} \phi_0}{\phi_0 - \pi}$$

So $$\frac{f_{min.} \phi_0}{\phi_0 - \pi} \geq f_0 \geq \frac{f_{max.} \phi_0}{\phi_0 + \pi}$$

from which $$\phi_0 \leq \frac{\frac{f_{max.}}{f_{min.}} + 1}{\frac{f_{max.}}{f_{min.}} - 1}\pi \quad (7)$$

A study of the above relationships shows that the phase shift of the delay line at the center frequency $f_0$ may have a value of 450° without causing ambiguity over a 2:1 bandwidth since phase shift and frequency are directly related.

Upon application of a signal of frequency $f$ ($f$ being different than $f_0$ and within the frequency range of the system) the signal applied to the input terminal 11 of the phase measuring device 10 will no longer be delayed 450° with respect to the signal applied to the input terminal 12. Rather, the delay time of the signal through the delay line 133 will be varied in direct proportion to the ratio between the applied frequency $f$ and the center frequency $f_0$, as can be seen from a study of Equation 4. Hence, superimposition of the control voltage output pulses on the helix voltage on the TWT's 20 and 30 can again be used to drive the servo system to a null balance. Furthermore, since the relationship between the frequency of applied signals and the magnitude of the control voltage output pulses is a first-order equation, as shown by Equation 6, the voltage measuring device connected to the output terminal 86 can be calibrated in terms of frequency.

Thus there has been described an improved phase measuring apparatus incorporating a closed loop servo system working to a null balance, the servo system having an extremely rapid response time, thereby enabling operation on single pulses in the submicrosecond region. There has also been described two particular useful applications of the phase measuring apparatus: a microwave direction finder, and a microwave frequency meter. Although the invention has been described with a certain degree of particularity, it is understood that the present disclosure has been made only by way of example and that certain changes in the details of construction and the combination and arrangement of parts may be resorted to without departing from the spirit and the scope of the invention as hereinafter claimed. For example, it is apparent from the foregoing specification and the mathematical equations contained therein that for use in the direction finder embodiment the phase shifts of the variable phase shifting devices must be directly proportional to frequency and a known function of applied control voltage. For use in the frequency meter embodiment the phase shifts of the variable phase shifting devices need be only a known function of frequency and a known function of applied control voltage. The alternative embodiment of the basic phase measuring device, as shown in FIGURE 5, utilizes the same principle of operation as that of the preferred embodiment of FIGURE 1 and hence may be used in the illustrated direction finder and frequency meter embodiments, as well as many other applications.

What is claimed is:

1. A closed loop servo system for measuring the relative phase difference between two electrical signals of a known frequency, one of the signals being applied to a first input terminal and the other signal being simultaneously applied to a second input terminal, said servo system comprising, in combination: first and second variable phase shifting devices, the phase shifts of said devices being controllable in accordance with the magnitude of an applied control voltage, the input of said first phase shifting device being coupled to said first input terminal, the input of said second phase shifting device being coupled to said second input terminal, said variable phase shifting devices being adjustable to provide identical phase shifts for in-phase input conditions at a predetermined frequency; phase combining means having first and second input terminals and first and second output terminals, said phase combining means being adapted to independently vectorially combine in phase quadrature signals fed to its first and second input terminals, the first input terminal of said phase combining means being coupled to the output of said first phase shifting device, the second input terminal of said phase combining means being coupled to the output of said second phase shifting device; detection means coupled to the first and second output terminals of said phase combining means for producing an electrical output in accordance with the difference in magnitudes of the envelopes of signals appearing at the first and second output terminals of said phase combining means, the output of said detection means providing a control voltage; means for differentially applying the control voltage output of said detection means to said first and second variable phase shifting devices to control the phase shifts of said phase shifting devices to drive the servo system to a null balance; and output coupling means in said servo system to provide an electrical output proportional to said control voltage and to the relative phase difference between applied input signals.

2. A phase measuring apparatus for measuring the relative phase difference between two electrical signals of a known frequency, one of the signals being applied to a first input terminal and the other signal being simultaneously applied to a second input terminal comprising, in combination: first and second variable phase shifting devices, the phase shifts of said devices being controllable in accordance with the magnitude of an applied control voltage, the input of said first phase shifting device being coupled to said first input terminal, the input of said second phase shifting device being coupled to said second input terminal, said variable phase shifting devices being adjustable to provide identical phase shifts for in-phase input conditions at a predetermined frequency; phase combining means having first and second input terminals and first and second output terminals, said phase combining means being adapted to independently vectorially combine in phase quadrature signals fed to said first and second input terminals, the first input terminal of said phase combining means being coupled to the output of said first phase shifting device, the second input terminal of said phase combining means being coupled to the output of said second phase shifting device; detection means coupled to the first and second output terminals of said phase combining means for producing an electrical output in accordance with the difference in magnitudes of the envelopes of signals appearing at the first and second output terminals of said phase combining means; means for amplifying the output of said detection means; phase splitting means coupled to the output of said amplifying means, one output of said phase splitting means being coupled to said first variable phase shifting device to provide a control voltage therefor, the other output of said phase splitting means being coupled to said second variable phase shifting device to provide a control voltage therefor, the coupling of said control voltage outputs of said phase splitting means to said variable phase shifting devices thereby completing a closed loop servo system driven to a null balance by variation of the phase shifts of said variable phase shifting devices in accordance with the magnitude of said control voltage; and, output coupling means in said servo loop to provide an electrical output directly proportional to said control voltage and to the relative phase difference between applied input signals.

3. A phase measuring apparatus for measuring the relative phase difference between two electrical signals of a known frequency, one of the signals being applied to a first input terminal and the other signal being simultaneously applied to a second input terminal comprising, in combination: first and second identical variable phase shifting devices, the phase shifts of said devices being variable in accordance with the magnitude of an applied control voltage, the input of said first phase shifting device being coupled to said first input terminal and the input of said second phase shifting device being coupled to said second input terminal; phase adjusting means coupled to said first phase shifting device, said phase adjusting means being adapted to adjust the phase shift of said first phase shifting device to equal the phase shift of said second phase shifting device for in-phase signal input conditions at a predetermined frequency; a hybrid junction having first and second input terminals and first and second output terminals, said hybrid junction being adapted to combine in phase quadrature signals applied to its first and second input terminals, said first input terminal of said hybrid junction being coupled to the output of said first phase shifting device through said phase adjusting means, said second input terminal of said hybrid junction being coupled to the output of said second phase shifting device; detection means coupled to the first and second output terminals of said hybrid junction for producing an electrical output in accordance with the difference between the magnitudes of the envelopes of signals appearing at the first and second output terminals of said hybrid junction, said detection means including a subtracter circuit; means for amplifying the output of said detection means; phase splitting means coupled to the output of said amplifying means, one output of said phase splitting means being coupled to said first variable phase shifting device to provide a control voltage therefor, the other output of said phase splitting means being coupled to said second variable phase shifting device to provide a control voltage therefor, the coupling of said control voltage outputs of said phase splitting means to said variable phase shifting means thereby completing a closed loop servo system driven to a null balance by variation of the phase shifts of said variable phase shifting devices in accordance with the magnitude of said control voltage; and, output coupling means in said servo loop to provide an electrical output directly proportional to said control voltage and to the relative phase difference between applied input signals.

4. A phase measuring apparatus for measuring the relative phase difference between two electrical signals of a known frequency, one of the signals being applied to a first input terminal and the other signal being simultaneously applied to a second input terminal comprising, in combination: first and second identical traveling wave tube amplifiers, the phase shifts of said amplifiers being variable in accordance with the magnitude of an applied helix voltage, the input of said first amplifier being coupled to said first input terminal and the input of said second amplifier being coupled to said second input terminal; phase adjusting means coupled to said first traveling wave tube amplifier, said phase adjusting means being adapted to adjust the phase shift of said first amplifier to equal the phase shift of said second amplifier for in-phase signal input conditions at a predetermined frequency; a hybrid junction having first and second input terminals and first and second output terminals, said hybrid junction being adapted to combine in phase quadrature signals applied to its first and second input terminals, said first terminal of said hybrid junction being coupled to the output of said first traveling wave tube amplifier through said phase adjusting means, said second input terminal of said hybrid junction being coupled to the output of said second traveling wave tube amplifier; detection means for producing an electrical output in accordance with the difference between the magnitudes of the envelopes of signals appearing at the first and second output terminals of said hybrid junction, said detection means including a first diode detector coupled to the first output terminals of said hybrid junction and a second diode detector coupled to the second output terminal of said hybrid junction; means for amplifying the output of said detection means; phase splitting means coupled to the output of said amplifying means, the first output of said phase splitting means being superimposed upon the D.C. helix voltage applied to said first traveling wave tube amplifier, the second output of said phase splitting means being reversed in phase with respect to the first output of said phase splitting means and being superimposed upon the D.C. helix voltage applied to said second traveling wave tube amplifier, the superimposition of the differential outputs of said phase splitting means upon the helix voltages of said traveling wave tube amplifiers thereby completing a closed loop servo system driven to a null balance in accordance with variations in the helix voltages caused by the magnitude of the outputs of said phase splitting means; and output coupling means in said servo system to provide an electrical output directly proportional to the output voltage of said subtracter circuit and to the relative phase difference between applied input signals.

5. A phase measuring apparatus for measuring the relative phase difference between two electrical signals of a known frequency, one of the signals being applied to a first input terminal and the other signal being simultaneously applied to a second input terminal comprising, in combination: first and second variable phase shifting devices, the phase shifts of said devices being controllable in accordance with the magnitude of an applied control voltage, the input of said first phase shifting device being coupled to said first input terminal, the input of said second phase shifting device being coupled to said second input terminal, said variable phase shifting devices being adjustable to provide identical phase shifts for in-phase input conditions at a predetermined frequency; phase combining means having first and second input terminals and first and second output terminals, said phase combining means being adapted to independently vectorially combine in phase quadrature signals fed to said first and second input terminals, the first input terminal of said phase combining means being coupled to the output of said first phase shifting device, the second input terminal of said phase combining means being coupled to the output of said second phase shifting device; a first diode detector having its anode coupled to said first output terminal of said phase combining means; a second diode detector having its cathode terminal coupled to said second output terminal of said phase combining means; an adder circuit having first and second input terminals and adapted to produce an electrical output in accordance with the sum of the magnitudes of signals applied to its input terminals, said adder circuit first input terminal being coupled to the cathode terminal of said first diode detector, said adder circuit second input terminal being coupled to the anode terminal of said second diode detector; means for amplifying the output of said adder circuit; phase splitting means coupled to the output of said amplifying means, one output of said phase splitting means being coupled to said first variable phase shifting device to provide a control voltage therefor, the other output of said phase splitting means being coupled to said second variable phase shifting device to provide a control voltage therefor, the coupling of said control voltage outputs of said phase splitting means to said variable phase shifting devices thereby completing a closed loop servo system driven to a null balance by variation of the phase shifts of said variable phase shifting devices in accordance with the magnitude of said control voltage; and, output coupling means in said servo loop to provide an electrical output directly proportional to said control voltage and to the relative phase difference between applied input signals.

6. Direction finding apparatus for measuring the angle of arrival of an electromagnetic wave at two antennas with respect to a straight line intersecting both antennas, said apparatus comprising, in combination: first and second variable phase shifting devices having phase shifts which are directly proportional to the frequency of applied signals and a known function of an applied control voltage, the input of said first phase shifting device being coupled to the first antenna, the input of said second phase shifting device being coupled to the second antenna, said variable phase shifting devices being adjustable to provide identical phase shifts for in-phase input conditions at a predetermined frequency; phase combining means having first and second input terminals and first and second output terminals, said phase combining means being adapted to independently vectorially combine in phase quadrature signals fed to said first and second input terminals, the first input terminal of said phase combining means being coupled to the output of said first phase shifting device, the second input terminal of said phase combining means being coupled to the output of said second phase shifting device; detection means coupled to the first and second output terminals of said phase combining means for producing an electrical output in accordance with the difference in magnitudes of the envelopes of signals appearing at the first and second output terminals of said phase combining means; means for amplifying the output of said detection means; phase splitting means coupled to the output of said amplifying means, one output of said phase splitting means being coupled to said first variable phase shifting device to provide a control voltage therefor, the other output of said phase splitting means being coupled to said second variable phase shifting device to provide a control voltage therefor, the coupling of said control voltage outputs of said phase splitting means to said variable phase shifting devices thereby completing a closed loop servo system driven to a null balance by variation of the phase shifts of said variable phase shifting devices in accordance with the magnitude of said control voltage; and, output coupling means in said servo loop to provide an electrical output directly proportional to said control voltage and to the angle of arrival of said electromagnetic wave.

7. Direction finding apparatus for measuring the angle of arrival of an electromagnetic wave at two antennas with respect to a straight line intersecting both antennas, said apparatus comprising, in combination: first and second identical traveling wave tube amplifiers, the phase shifts of said amplifiers being variable in accordance with the magnitude of an applied helix voltage, the input of said first amplifier being coupled to the first antenna and the input of said second amplifier being coupled to the second antenna; phase adjusting means coupled to said first traveling wave tube amplifier, said phase adjusting means being adapted to adjust the phase shift of said first amplifier to equal the phase shift of said second amplifier for in-phase signal input conditions at a predetermined frequency; a hybrid junction having first and second input terminals and first and second output terminals, said hybrid junction being adapted to combine in phase quadrature signals applied to its first and second input terminals; said first terminal of said hybrid junction being coupled to the output of said first traveling wave tube amplifier through said phase adjusting means, said second input terminal of said hybrid junction being coupled to the output of said second traveling wave tube amplifier; detection means coupled to the first and second output terminals of said hybrid junction for producing an electrical output in accordance with the difference between the magnitudes of the envelopes of signals appearing at the first and second output terminals of said hybrid junction; means for amplifying the output of said detection means; phase splitting means coupled to the output of said amplifying means, the first output of said phase splitting means being superimposed upon the D.C. helix voltage applied to said first traveling wave tube amplifier, the second output of said phase splitting means being reversed in phase with respect to the first output of said phase splitting means and being superimposed upon the D.C. helix voltage applied to said second traveling wave tube amplifier, the superimposition of the differential outputs of said phase splitting means upon the helix voltages of said traveling wave tube amplifiers thereby completing a closed loop servo system driven to a null balance in accordance with variations in the helix voltages caused by the magnitude of the outputs of said phase splitting means; and output coupling means in said servo system to provide an electrical output directly proportional to the output voltage of said subtracter circuit and to the angle of arrival of said electromagnetic wave.

8. Frequency measuring apparatus for determining the frequency of a microwave pulse applied to an input terminal, said apparatus comprising, in combination: power dividing means coupled to said input terminal, said power dividing means having first and second output terminals; said power dividing means being adapted to split an applied input signal pulse into two separate output pulses with one of the pulses appearing at said first output terminal and the other pulse appearing at said second output terminal; phase delay means coupled to said first output terminal of said power dividing means, said phase delay means providing a predetermined electrical phase delay at a predetermined frequency; first and second variable phase shifting devices, the phase shifts of said devices being controllable in accordance with the magnitude of an applied control voltage, the input of said first phase shifting device being coupled to the output of said phase delays means, the input of said second phase shifting device being coupled to said second output terminal of said power dividing means, said variable phase shifting devices being adjustable to provide identical phase shifts for in-phase input conditions at said predetermined frequency; phase combining means having first and second input terminals and first and second output terminals, said phase combining means being adapted to independently vectorially combine in phase quadrature signals fed to said first and second input terminals, the first input terminal of said phase combining means being coupled to the output of said first phase shifting device, the second input terminal of said phase combining means being coupled to the output of said second phase shifting device; detection means coupled to the first and second output terminals of said phase combining means for producing an electrical output in accordance with the difference in magnitudes of the envelopes of signals appearing at the first and second output terminals of said phase combining means; means for amplifying the output of said detection means; phase splitting means coupled to the output of said amplifying means, one output of said phase splitting means being coupled to said first variable phase shifting device to provide a control voltage therefor, the other output of said phase splitting means being coupled to said second variable phase shifting device to provide a control voltage therefor, the coupling of said control voltage outputs of said phase splitting means to said variable phase shifting devices thereby completing a closed loop servo system driven to a null balance by variation of the phase shifts of said variable phase shifting devices in accordance with the magnitude of said control voltage; and, output coupling means in said servo loop to provide an electrical output directly proportional to said control voltage and to the frequency of said microwave pulse with respect to said predetermined frequency.

9. Frequency measuring apparatus for determining the frequency of a microwave signal pulse applied to a signal input terminal, said apparatus comprising, in combination: a hybrid junction having first and second input terminals and first and second output terminals, said first input terminal of said hybrid junction being terminated in the characteristic impedance of said hybrid junction, said second input terminal of said hybrid junction being coupled to said signal input terminal; a delay line coupled to said first output terminal of said hybrid junction, said delay line being adapted to provide a predetermined phase delay at a predetermined frequency; first and second variable phase shifting devices, the phase shifts of said devices being controllable in accordance with the magnitude of an applied control voltage, the input of said first phase shifting device being coupled to the first output terminal of said hybrid junction through said delay line, the input of said second phase shifting device being coupled to the second output terminal of said hybrid junction, said variable phase shifting devices being adjustable to provide identical phase shifts for in-phase input conditions at a pretermined frequency; phase combining means having first and second input terminals and first and second output terminals, said phase combining means being adapted to independently vectorially combine in phase quadrature signals fed to said first and second input terminals, the first input terminal of said phase combining means being coupled to the output of said first phase shifting device, the second input terminal of said phase combining means being coupled to the output of said second phase shifting device; detection means coupled to the first and second output terminals of said phase combining means for producing an electrical output in accordance with the difference in magnitudes of the envelopes of signals appearing at the first and second output terminals of said phase combining means; means for amplifying the output of said detection means; phase splitting means coupled to the output of said amplifying means, one output of said phase splitting means being coupled to said first variable phase shifting device to provide a control voltage therefor, the other output of said phase splitting means being coupled to said second variable phase shifting device to provide a control voltage therefor, the coupling of said control voltage outputs of said phase splitting means to said variable phase shifting devices thereby completing a closed loop servo system driven to a null balance by variation of the phase shifts of said variable phase shifting devices in accordance with the magnitude of said control voltage; and, output coupling means in said servo loop to provide an electrical output directly proportional to said control voltage and to the frequency of said microwave input pulse relative to said predetermined frequency.

10. Frequency measuring apparatus for determining the frequency of a microwave signal pulse applied to a signal input terminal, said apparatus comprising, in combination: a first hybrid junction having first and second input terminals and first and second output terminals, said first input terminal of said first hybrid junction being terminated in the characteristic impedance of said first hybrid junction, said second input terminal of said first hybrid junction being coupled to said signal input terminal; a delay line coupled to said first output terminal of said first hybrid junction, said delay line being adapted to provide a predetermined electrical phase delay at a predetermined frequency; first and second identical traveling wave tube amplifiers, the phase shifts of said amplifiers being variable in accordance with the magnitude of an applied helix voltage, the input of said first amplifier being coupled to the output of said delay line and the input of said second amplifier being coupled to the second output terminal of said first hybrid junction; phase adjusting means coupled to said first traveling wave tube amplifier, said phase adjusting means being adapted to adjust the phase shift of said first amplifier to equal the phase shift of said second amplifier for in-phase signal input conditions at a predetermined frequency; a second hybrid junction having first and second input terminals and first and second output terminals, said second hybrid junction being adapted to combine in phase quadrature signals applied to its first and second input terminals, said first input terminal of said second hybrid junction being coupled to the output of said first traveling wave tube amplifier through said phase adjusting means, said second input terminal of said second hybrid junction being coupled to the output of said second traveling wave tube amplifier; detection means coupled to the first and second output terminals of said first hybrid junction for producing an electrical output in accordance with the difference between the magnitudes of the envelopes of signals appearing at the first and second output terminals of said second hybrid junction, said detection means including a subtracter circuit; means for amplifying the output of said detection means; phase splitting means coupled to the output of said amplifying means, the first output of said phase splitting means being superimposed upon the D.C. helix voltage applied to said first traveling wave tube amplifier, the second output of said phase splitting means being reversed in phase with respect to the first output of said phase splitting means and being superimposed upon the D.C. helix voltage applied to said second traveling wave tube amplifier, the superimposition of the differential outputs of said phase splitting means upon the helix voltages of said traveling wave tube amplifiers thereby completing a closed loop servo system driven to a null balance in accordance with variations in the helix voltages caused by the magnitude of the outputs of said phase splitting means; and output coupling means in said servo system to provide an electrical output directly proportional to the output voltage of said subtracter circuit and to the frequency of said microwave signal pulse relative to said predetermined frequency.

11. A closed loop servo system for measuring the relative phase difference between two electrical signals of a known frequency, one of the signals being applied to a first input terminal and the other signal being simultaneously applied to a second input terminal, said servo system comprising, in combination: first and second variable phase shifting devices, the phase shifts of said devices being variable in accordance with changes in an applied control signal, the input of said first phase shifting device being coupled to said first input terminal, the input of said second phase shifting device being coupled to said second input terminal, said variable phase shifting devices being adjustable to provide identical phase shifts for in-phase input conditions; phase detection means having a first input coupled to the output of said first variable phase shifting device and a second input coupled to the output of said second variable phase shifting device, said phase detection means being adapted to produce an electrical output in accordance with the phase differential between a signal applied to its first input and a signal applied to its second input, the output of said phase detection means providing a control signal; phase-splitting means connected between the output of said phase-detection means and said first and said second variable phase-shifting devices to provide phase-opposed control signals to said first and said second phase-shifting devices for differentially applying the phase-opposed control signal output of said phase detection means to said first and second variable phase shifting devices to control the phase shift of said phase shifting devices to drive the servo system to a null balance; and output coupling means in said servo system to provide an electrical output proportional to said control signal and to the relative phase difference between applied input signals.

12. A closed loop servo system for measuring the relative phase difference between two electrical signals of a known frequency, one of the signals being applied to a first input terminal and the other signal being simultaneously applied to a second input terminal, said servo system comprising, in combination: first and second variable phase shifting devices, the phase shifts of said devices being variable in accordance with changes in an applied control signal, the input of said first phase shifting device being coupled to said first input terminal, the input of said second phase shifting device being coupled to said second input terminal, said variable phase shifting devices being adjustable to provide identical phase shifts for in-phase input conditions; phase detection means having a first input coupled to the output of said first variable phase shifting device and a second input coupled to the output of said second variable phase shifting device, said phase detection means being adapted to produce an electrical output in accordance with the phase differential between a signal applied to its first input and a signal applied to its second input, the output of said phase detection means providing a control signal; means connected between said output of said phase detection means and one of said variable phase shifting devices, for applying the control signal ouput of said phase detection means to said one of said variable phase shifting devices to control the phase shift thereof to drive the servo system to a null balance; and output coupling means in said servo system to provide an electrical output proportional to said control signal and to the relative phase difference between applied input signals.

13. A closed loop servo system for measuring the relative phase difference between two electrical signals of a known frequency, one of the signals being applied to a first input terminal and the other signal being simultaneously applied to a second input terminal, said servo system comprising, in combination: a variable phase shifting device, the phase shift of which is electrically variable in accordance with changes in an applied control signal, the input of said phase shifting device being coupled to said first input terminal, a phase adjusting means connected to said second input terminal; phase detection means having a first input coupled to the output of said variable phase shifting device and a second input coupled to the output of said phase adjusting means, said phase detection means being adapted to produce an electrical output in accordance with the phase differential between a signal applied to its first input and a signal applied to its second input, the output of said phase detection means providing a control signal; means connected between said phase detection means and said variable phase shifting device for applying the control signal output of said phase detection means to said variable phase shifting device to control the phase shift thereof to drive the servo system to a null balance; and output coupling means in said servo system to provide an electrical output proportional to said control signal and to the relative phase difference between applied input signals.

14. A closed loop servo system for measuring the relative phase difference between two electrical signals of a known frequency, one of the signals being applied to a first input terminal and the other signal being simultaneously applied to a second input terminal, said servo system comprising, in combination: a variable phase shifting device, the phase shift of which is controllable in accordance with the magnitude of an applied control voltage, the input of said phase shifting device being coupled to said first input terminal; a phase adjusting means connected to said second input terminal; phase combining means having first and second input terminals and first and second output terminals, said phase combining means being adapted to independently vectorially combine in a predetermined phase relationship signals fed to its first and second input terminals, the first input terminal of said phase combining means being coupled to the output terminal of said phase shifting device, the second input terminal of said phase combining means being coupled to said phase adjusting means; detection means coupled to the first and second output terminals of said phase combining means for producing an electrical output in accordance with the difference in magnitudes of the envelopes of signals appearing at the first and second output terminals of said phase combining means, the output of said detection means providing a control voltage; means for applying the control voltage output of said detection means to said variable phase shifting device to control the phase shift thereof to drive the servo system to a null balance; and output coupling means in said servo system to provide an electrical output proportional to said control voltage and to the relative phase difference between applied input signals.

References Cited by the Examiner
UNITED STATES PATENTS

| | | | |
|---|---|---|---|
| 2,474,268 | 6/1949 | Marchand | 324—84 |
| 2,736,019 | 2/1956 | Vogely | 324—83 X |
| 2,914,762 | 11/1959 | Gross | 343—16 X |
| 3,138,800 | 6/1964 | Speller | 324—84 X |

OTHER REFERENCES

"Precision Tracking with Monopulse Radar," article in Electronics, April 22, 1960.

WALTER L. CARLSON, *Primary Examiner.*